United States Patent [19]
Graff

[11] Patent Number: 5,158,171
[45] Date of Patent: Oct. 27, 1992

[54] WOVEN WIRE BELT

[75] Inventor: Wilhelm Graff, Dueren, Fed. Rep. of Germany

[73] Assignee: GKD Gebr. Kufferath, Dueren, Fed. Rep. of Germany

[21] Appl. No.: 762,393

[22] Filed: Sep. 19, 1991

[30] Foreign Application Priority Data

Oct. 4, 1990 [DE] Fed. Rep. of Germany ....... 4031212

[51] Int. Cl.⁵ ............................................. B65G 15/54
[52] U.S. Cl. ..................................... 198/848; 198/842
[58] Field of Search ............... 198/842, 848, 847, 840, 198/844.1

[56] References Cited

U.S. PATENT DOCUMENTS 3,154,459 10/1964 Cranston .......................... 198/848 X
3,368,663 2/1968 Kufferath ........................ 198/898 X
4,249,653 2/1981 Kufferath-Kassner ............. 198/848
4,318,469 3/1982 Kufferath-Kassner ............. 198/842

FOREIGN PATENT DOCUMENTS 439030 1/1927 Fed. Rep. of Germany.
2540525 8/1984 France.

Primary Examiner—Robert P. Olszewski
Assistant Examiner—Cheryl L. Gastineau
Attorney, Agent, or Firm—Body, Vickers & Daniels

[57] ABSTRACT

A woven wire belt for an apparatus in which the belt runs in the direction of its warp wires over rotatable rollers has weft wires which have lower projections which protrude at the lower side of the belt, for lateral guidance of the belt. Upper projections in the weft wires or inserted guide lines protrude beyond the upper side of the belt and serve for the punctiform support of a conveyed product or engage as carriers behind the conveyed product if the latter is conveyed by a belt running obliquely upwards or obliquely downwards.

11 Claims, 2 Drawing Sheets

WOVEN WIRE BELT

BACKGROUND OF THE INVENTION

1. Field of the invention

The present invention relates to a woven wire belt, for example, for use as a conveyor belt.

The belt is useful particularly in an apparatus in which the belt runs over rotatable rollers.

2. Description of the prior art

Belts such as conveyor belts are known in which the woven wire belt runs in the direction of warp wires over rotatable rollers. There are wires extending transversely to the running direction of the belt which have lower projections which are offset to protrude beyond the underside of the woven structure and engage in guide grooves on the circumference of the rollers.

Woven wire belts of this type are used for the conveyance of many products, for example of piece goods, boards, sheets, fabrics, which can hereby also be taken through a treatment liquid, dried or processed in another way. Whereas the woven wire belt consists of flexible wires in its longitudinal direction and rigid weft wires in its transverse direction, which produce a smooth belt surface, the lower projections offset to protrude beyond the underside of the woven structure form rows of projections by which the belt guides itself laterally in guide grooves of the driving and deflecting rollers. Woven wire belts of this type are known from German patent 1 271 624 and German patent 29 00 871 C2.

Although the known woven wire belts can be produced with a relatively large mesh width, they still offer the products to be conveyed a relatively large supporting area. The transversely running weft wires and, in the case of certain embodiments, also the warp wires or the crossing points between weft wires and warp wires leave impressions in the conveyed product. This is often undesired and it is often required that the conveyed product is kept clear from the surface of the woven wire belt as far as possible or at most is supported at particular points on the woven wire conveyor belt is often set.

SUMMARY OF THE INVENTION

Therefore the object of the invention is to provide a woven wire belt in such a way that it supports the product to be conveyed on it only at particular points and the actual woven structure of the conveyor belt is prevented from leaving impressions on the product to be conveyed.

In accordance with the invention in one aspect, in a woven wire belt, some of the wires that extend transversely to the direction of travel of the belt have upper projections. Each of these upper projections is arranged intermediately between two adjacent warp wires. In this way the upper projections, which may be projections shaped into the transversely extending wires, are offset to protrude beyond the upper side of the woven structure.

This design has the advantage that it produces on the woven wire belt spaced-apart, punctiform elevations, which support the conveyed product at certain points, so that the conveyed product, for example a metal plate, a web of sheeting or the like, does not come into contact with the woven surface of the conveyor belt.

Such a punctiform support is particularly advantageous for example when a metal plate or other object conveyed on the woven wire belt has previously been painted or coated and the paint or the coating is to be dried or set during conveyance on the woven wire belt by air which is blown from below through the woven wire belt onto the conveyed product.

The offset upper projections or humps are also of advantage when a sheet-like conveyed product, for example a web of sheeting or fabric, extending between two woven wire belts according to the invention is to be taken through a treatment liquid or a powder bath in such a way that as large a surface as possible of the web taken through the bath comes into contact with the powder or the treatment liquid.

The upper projections protruding beyond the surface of the bolt can also serve as carriers for piece goods transported on the belt, if the belt runs obliquely upwards or downwards and the product conveyed on the belt is to be prevented from slipping on the belt surface.

In order to maintain the weave at all crossing points between warp wires and weft wires, it is important that the upper projections are in each case arranged midway between two laterally spaced-apart warp wires and the wires having the upper projections cannot be displaced transversely to the running direction of the belt. Such lateral displacement can be prevented by the lower projections which thereby serve not only to guide the woven wire belt in the transverse direction but also to stabilise the upper projections.

The upper projections may be arranged laterally spaced apart at a spacing which corresponds to a multiple of the warp pitch. They are expediently arranged here in a plurality of wires extending transversely to the running direction so as to be one behind the other in a row in the running direction of the belt. This has the advantage that in a lower run of a continuous belt the upper projections can at the same time assume the lateral guidance of the belt, if such guidance is necessary, and they run in circumferential grooves of supporting rollers which support the lower run.

In one embodiment of the supporting woven belt according to the invention, guide wires are provided which are wires woven with the warp wires in between the weft wires. The guide wires extend transversely to the running direction of the belt. They may have a flattening, at least on a side parallel to the plane of the belt. The upper projections can be arranged in these guide wires. Such a design is advantageous in the case of lightweight woven wire belts with simple linen weave, for which the lateral guidance is assumed by separate guide wires, in which case the lower projections are also arranged in the guide wires. In the case of these belts, both the upper and the lower projections can be arranged in the guide wires, the flattening of the guide wires preventing the guide wires from turning about their longitudinal axis and the offset upper projections being disposed approximately parallel to the surfaces of the woven wire belt.

In the case of another embodiment of the woven wire belt according to the invention, the upper projections are arranged in the weft wires of the woven structure, which also have the lower projections which are offset to protrude beyond the underside of the woven structure. With this type of woven wire belt, the lower projections simultaneously serving to produce the weave prevent turning of the weft wires and keep the upper projections upright, even if the weft wires, in which the upper projections are provided, have a circular cross-section.

It is expedient in both embodiments if upper projections arranged one behind the other in a row in the running direction of the belt are spaced apart at a spacing which corresponds to an integral multiple of the weft wire spacing. All the wires provided with upper projections then have an analogous weave and it is ensured that the upper projections of each row align precisely with one another in the longitudinal direction.

The invention also consists in a conveyor having a continuous belt as described above, and rollers to define the belt path.

BRIEF INTRODUCTION OF THE DRAWINGS

Further features and advantages of the invention are given in the following description and the drawing, in which a preferred embodiment of the invention is explained in further detail with reference to an exemplary embodiment and in which.

DESCRIPTION OF THE PREFERRED EMBODIMENT

Figure 2:
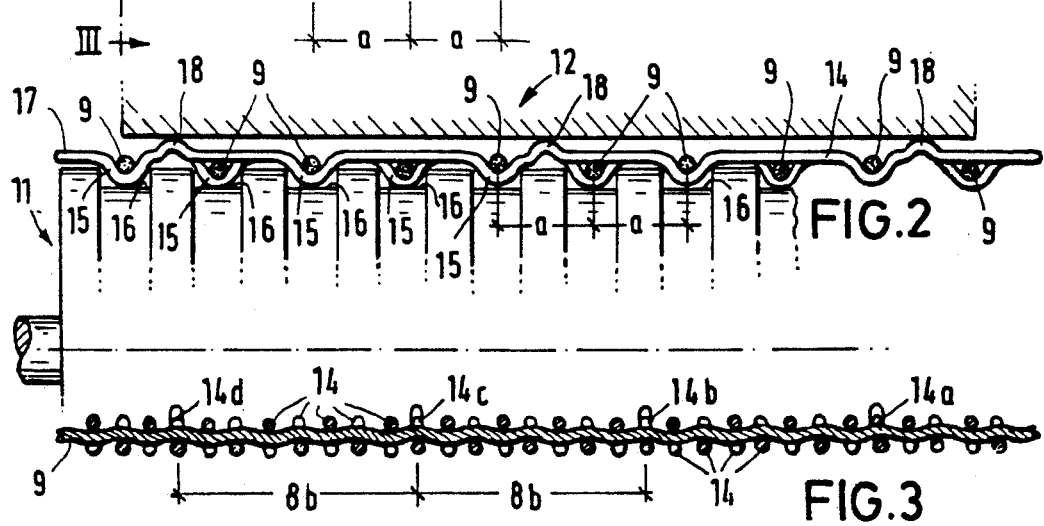
FIG. 2 shows the belt of FIG. 1 in a cross-section according to line II—II transversely to the running direction of the belt, with an object conveyed on the belt indicated.

In the drawing, 10 denotes a supporting woven belt for a conveying apparatus, of which in FIG. 2 only one deflecting roller 11, around which the woven wire belt 10 runs, is partially represented. The woven wire belt 10 serves for the conveyance of piece goods, for example painted car or machine parts, one of which is indicated in FIG. 2 merely by its lower edge and is denoted by 12.

The woven wire belt 10 represented in the drawing comprises flexible warp wires 9, which extend in the longitudinal direction or running direction 13 of the belt and consist of thin, intertwisted metal wires, and relatively stiff, monofilament weft wires 14, which extend transversely to the running direction 13 and are woven with the warp wires 9 in linen weave. Each weft wire is provided with a lower hump or projection 15, offset to protrude beyond the underside of the woven wire structure 10, wherever it runs underneath a warp wire but is smooth and straight wherever it crosses over a warp wire 9. As a result, in the running direction 13 on the underside of the woven wire belt there are rows of projections, by which the woven wire belt guides itself in groove-shaped channels 16 which are arranged laterally spaced apart on the circumference of the deflecting roller 11. The other driving and deflecting rollers of the conveying apparatus have similar channels.

Individual weft wires 14, namely the weft wires 14a, 14b, 14c and 14d, also have upper projections 18, which are offset to protrude upwardly at the upper side 17 of the woven structure 10 and are in each case arranged mid-way between two laterally spaced-apart warp wires 9. In this arrangement, in each case two upper projections 18 in one of the weft wires 14a, 14b, 14c and 14d are laterally spaced apart at a spacing which corresponds to a multiple of the warp pitch a. In the case of the embodiment shown, the upper projections 18 have a lateral spacing of in each case four times a.

Figure 1:
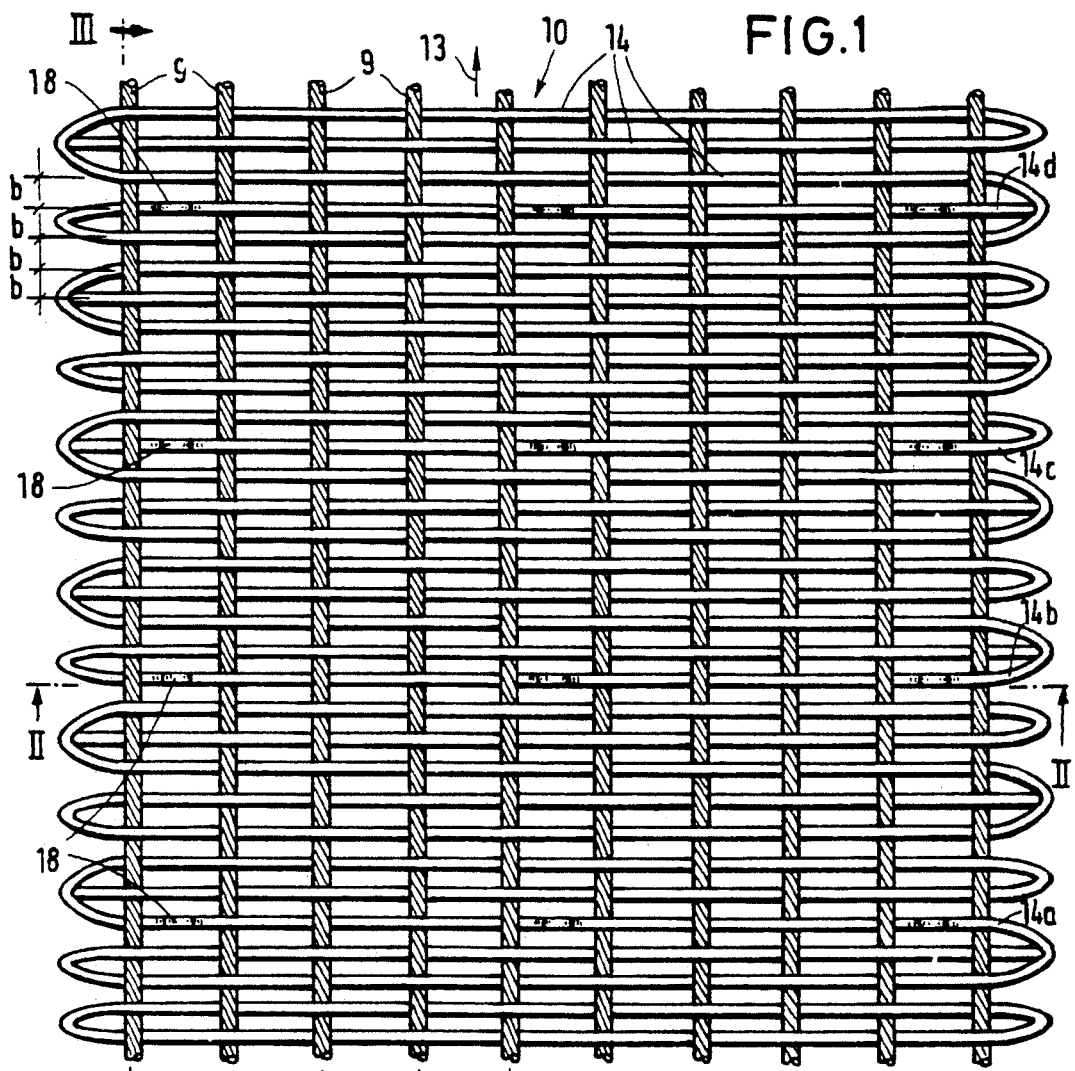
FIG. 1 shows a woven wire belt according to the invention in a plan view.
Figure 3:
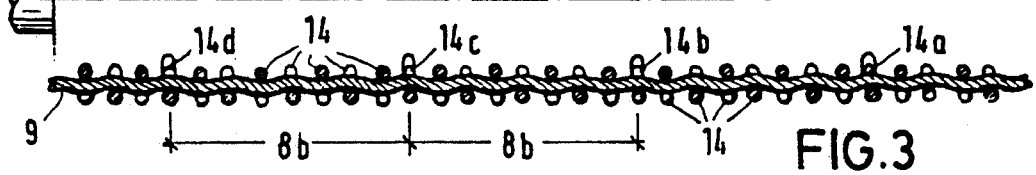
FIG. 3 shows the supporting woven belt according to FIG. 1 in a partial longitudinal section according to line III—III.

It can be seen from FIG. 1 that the upper projections 18 in the weft wires 14a to 14d are arranged one behind the other in several rows in the running direction 13 of the belt, so that they align with one another in the running direction. They are spaced apart in the running direction 13 of the belt 10 at a spacing which corresponds to an integral multiple of the weft wire spacing b, which in the case of the exemplary embodiment shown corresponds to eight times this spacing b (FIG. 3).

It can be seen from FIG. 2 that the conveyed product 12 is supported on the upper projections 18 only at particular points, whereas the greater part of its lower surface facing the woven wire belt 10 remains clear. The lower surface of the conveyed product 12 can therefore easily be cooled by air which is blown from the underside of the woven wire belt 10 through its meshes onto the underside of the conveyed product 12.

Figure 4:
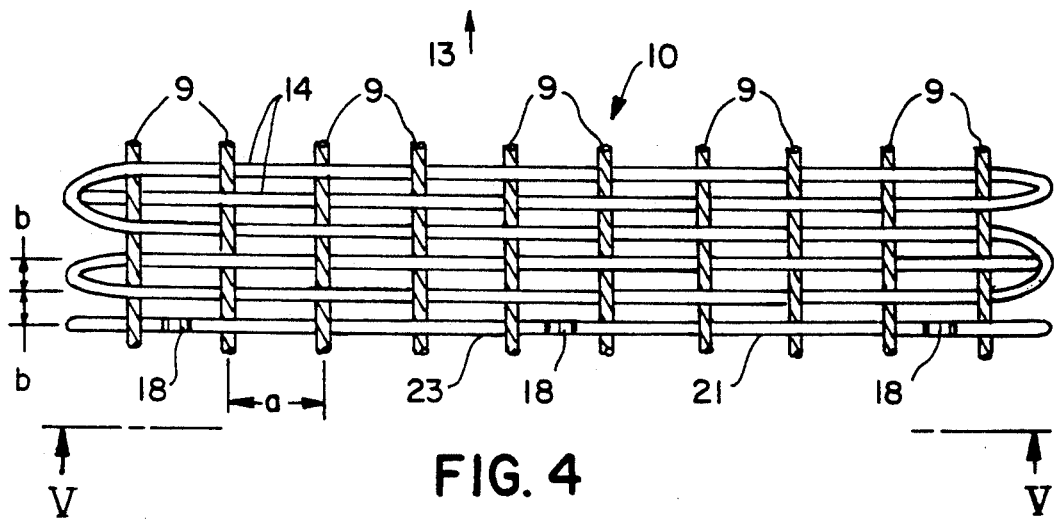
FIG. 4 shows a belt similar to the belt of FIG. 1 but using guide wives in addition to normal weft wives in plan view.
Figure 5:
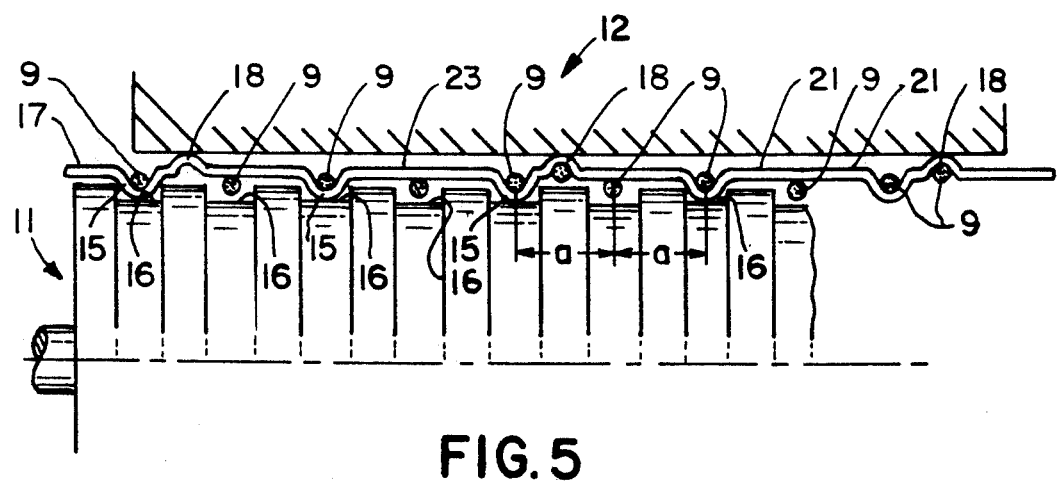
FIG. 5 shows the supporting woven belt according to FIG. 4 is a cross-section according to line V—V transversely to the running direction of the belt with an object conveyed on the belt indicated.

In another embodiment seen in FIGS. 4 and 5, the upper projections 18 and also the lower projections 15 are arranged in special guide wires 21, which are woven into the woven wire belt between two weft wires at a spacing of a multiple of the weft wire pitch b and are provided at least on one side with a flattening 23. The weft wires themselves then need not be provided with the lower projections or upper projections, since the guide wires are provided with both of these and assume both the lateral guidance of the woven wire belt and also support the conveyed product only at particular points on the upper side of the woven wire belt. The woven wire belt itself can then be a customary woven wire belt with linen weave. Such a design is suitable in particular for lightweight, thin belts, such as are used for the conveyance of webs of sheeting or fabric and are described in German patent 29 00 871 C2.

The invention is not restricted to the exemplary embodiments shown and described, but other embodiments are also possible without departing from the scope of the invention.

For example, the woven wire belt according to the invention may also be provided with more ore fewer upper projections, and it is also possible to provide a different weave if advantages are obtained as a result. However, it is preferable that the weave is present on both sides of the upper projections.

I claim:

1. A woven wire belt for use in an apparatus in which the belt runs over rotatable rollers, said belt comprising:
   warp wires which extend longitudinally in the direction of travel of the belt; and
   wires extending transversely to the direction of travel and are woven with the warp wires to form a woven structure, at least some of said transversely extending wires providing downwardly projecting lower projections of said belt and at least some of said transversely extending wires also providing upwardly projecting upper projections of said belt at positions which are each intermediate between two adjacent warp wires.

2. A belt according to claim 1 wherein said transversely extending wires which have said upper projections each have a plurality of said upper projections spaced apart at a spacing which corresponds to a multiple of the warp pitch.

3. A belt according to claim 1 wherein said lower projections are each provided at a position at which one of said transversely extending wires passes under one of said warp wires.

4. A belt according to claim 1 wherein said transversely extending wires comprise weft wires of said woven structure and said upper and lower projections are provided in said weft wires.

5. A belt according to claim 1 wherein said transversely extending wires comprise weft wires regularly spaced longitudinally of said belt and guide wires inserted between said weft wires, said upper projections being provided by said guide wires.

6. A belt according to claim 5 wherein both said upper and lower projections are provided by said guide wires.

7. A belt according to claim 5 wherein at least some of said guide wires each have a flat surface at a side parallel to the longitudinal direction of the belt.

8. A belt according to claim 1 wherein said upper projections are arranged in a plurality of sets with said upper projections in each said set being longitudinally aligned.

9. A belt according to claim 4 wherein the said upper projections are arranged in at least one array in which they are spaced longitudinally by a multiple of the weft wire spacing.

10. A conveyor comprising a continuous belt according to claim 1 and a plurality of rotatable rollers arranged to define an upper and a lower run of said belt.

11. A conveyor according to claim 10 wherein at least some of said rollers have guide grooves and wherein said lower projections of said belt are able to engage with said guide grooves.

* * * * *